United States Patent
Nosrati

(10) Patent No.: US 10,444,083 B2
(45) Date of Patent: Oct. 15, 2019

(54) MULTI-FIBER OPTIC SENSING SYSTEM

(71) Applicant: Watlow Electric Manufacturing Company, St. Louis, MO (US)

(72) Inventor: Mohammad Nosrati, Redwood City, CA (US)

(73) Assignee: Watlow Electric Manufacturing Company, St. Louis, MO (US)

(*) Notice: Subject to any disclaimer, the term of this patent is extended or adjusted under 35 U.S.C. 154(b) by 0 days.

(21) Appl. No.: 15/819,000

(22) Filed: Nov. 21, 2017

(65) Prior Publication Data

US 2019/0154521 A1     May 23, 2019

(51) Int. Cl.
| | |
|---|---|
| *G01K 11/32* | (2006.01) |
| *G01D 5/26* | (2006.01) |
| *G01D 5/353* | (2006.01) |
| *G02B 6/293* | (2006.01) |
| *G01J 3/02* | (2006.01) |
| *G01J 3/10* | (2006.01) |

(52) U.S. Cl.
CPC ........ *G01K 11/3213* (2013.01); *G01D 5/268* (2013.01); *G01D 5/35387* (2013.01); *G01J 3/0218* (2013.01); *G01J 3/10* (2013.01); *G01K 11/32* (2013.01); *G02B 6/29317* (2013.01)

(58) Field of Classification Search
CPC .... G01K 11/00; G01K 11/3213; G01D 5/268; G01D 5/35387; G01J 3/10; G01J 3/28; G01J 3/0218; G02B 6/29317; G01B 11/00; G01N 11/005; G01N 21/64; H01J 5/16; G02F 1/313; G01S 7/481; G01S 17/42; H01S 3/13; A61B 5/00
See application file for complete search history.

(56) References Cited

U.S. PATENT DOCUMENTS

| | | | |
|---|---|---|---|
| 5,255,286 A | 10/1993 | Moslehi et al. | |
| 6,353,475 B1* | 3/2002 | Jensen | G01N 27/44721 250/458.1 |
| 6,922,247 B2 | 7/2005 | Inamoto et al. | |
| 2004/0104336 A1 | 6/2004 | Melnyk et al. | |
| 2008/0117951 A1* | 5/2008 | Djeu | G01K 7/42 374/159 |
| 2009/0087140 A1* | 4/2009 | Castonguay | G02B 6/125 385/31 |
| 2013/0163915 A1 | 6/2013 | Lee et al. | |
| 2014/0240951 A1* | 8/2014 | Brady | F21V 13/08 362/19 |

FOREIGN PATENT DOCUMENTS

| | | |
|---|---|---|
| EP | 0655620 | 5/1995 |
| EP | 0801292 | 10/1997 |

(Continued)

OTHER PUBLICATIONS

International Search Report for International Application PCT/US2018/061725, dated Mar. 14, 2019.

*Primary Examiner* — Jamil Ahmed
(74) *Attorney, Agent, or Firm* — Burris Law, PLLC

(57) ABSTRACT

A fiber optic sensing system includes a plurality of optical probes, a light source, and a light splitting unit connecting the light source to the plurality of optical probes. The light splitting unit splits a light emitted from the light source into a plurality of divided lights, the divided lights being transmitted to the plurality of optical probes.

20 Claims, 6 Drawing Sheets

(56) References Cited

FOREIGN PATENT DOCUMENTS

| | | |
|---|---|---|
| EP | 0846939 | 6/1998 |
| EP | 0957344 | 11/1999 |
| EP | 1475619 | 11/2004 |
| EP | 1875204 | 1/2008 |
| WO | 2008/064113 | 5/2008 |

* cited by examiner

MULTI-FIBER OPTIC SENSING SYSTEM

FIELD

The present disclosure relates generally to sensors, and more particularly to fiber optic sensing systems for measuring temperature.

BACKGROUND

The statements in this section merely provide background information related to the present disclosure and may not constitute prior art.

Fiber optic sensors have been used in semiconductor applications for measuring temperature. This is primarily due to the fact that fiber optic sensors are immune to radio frequency (RF), microwave radiation, and high voltage. Therefore, fiber optic sensors can provide more accurate temperature measurements in a semiconductor wafer processing chamber without being affected by RF, microwave radiation and high voltage, which would otherwise occur in non-optic temperature sensors. Accordingly, fiber optic sensors may be integrated into an electrostatic chuck (ESC) to more accurately and reliably measure the temperature of the wafer.

Generally, multiple optic sensors are provided for multiple target locations in semiconductor applications, with each optic sensor requiring a fiber optic cable and a control box that calculates and determines a temperature of a target location based on the light transmitted through the fiber optic cable. Therefore, multiple fiber optic cables are required to be routed through the processing chamber to individual control boxes, thereby taking up valuable space in the semiconductor chamber and resulting in a complicated design.

These issues with the implementation of fiber optic sensors in a semiconductor application, among other applications with challenging environments, is addressed by the present disclosure.

SUMMARY

In one form, a fiber optic sensing system is provided, which includes a plurality of optical probes, a light source, and a light splitting unit connecting the light source to the plurality of optical probes. The light splitting unit splits a light emitted from the light source into a plurality of divided lights. The divided lights are transmitted to the plurality of optical probes.

In variations of this fiber optic sensing system, among additional systems set forth herein, the light splitting unit includes at least two groups of light splitters, which may further include a first group of splitter connected to the light source, and a second group of splitters disposed between the first group of splitter and the optical probes. The first group of splitter in one form includes a primary splitter for splitting a light emitted from the light source into a first divided light and a second divided light. In this variant, the second group of splitters includes two secondary light splitters for splitting the first and second divided lights into two third divided lights and two fourth divided lights, respectively. Further still, the light splitting unit may include "n" groups of light splitters for splitting the light from the light source into 2n divided lights for used with 2n optical probes, wherein n is a natural number. In one variation, the first group of light splitter is directly connected to the light source and includes only one light splitter.

In another variant, an optical filter is disposed in a main light path and between the light splitting unit and the light source. In this form, an optical detector may be disposed adjacent to the optical filter. In another form, a plurality of optical filters are disposed in paths of the divided lights and between the light splitting unit and the plurality of optical probes. A plurality of optical detectors may be adjacent the plurality of optical filters. Further still, the optical splitting unit may be selected from a group consisting of multiple groups of light splitters, a multi-furcated cable assembly, and a wave division multiplexing device. An optical switch module may be disposed between the light splitting unit and the plurality of optical probes. The optical switch module may be configured to allow or block one or more of the divided lights to reach the plurality of optical probes.

In another form, a fiber optic sensing system is provided, which includes a plurality of optical probes each including a fluorescent material for detecting a temperature of a target, a light source, a controller, and a light splitting unit for splitting a light emitted from the light source into a plurality of divided lights. The divided lights travel to the plurality of optical probes and are absorbed and re-emitted by the fluorescent materials of the plurality of optical probes. The controller determines temperatures of the targets based on re-emitted lights by the plurality of optical probes.

In variants of this fiber optic sensing system, among other systems described herein, the controller determines the temperature of the plurality of targets simultaneously. Further, a plurality of optical filters are disposed in the paths of the divided lights, and the controller may determine the temperature of the plurality of targets sequentially. An optical switch module for controlling transmission and blocking of the divided lights to the optical probes may also be provided.

In still another form, a fiber optic sensing system is provided, which includes a single light source, a plurality of optical probes, and a plurality of light splitters disposed between the single light source and the plurality of optical probes. The plurality of light splitters include n groups of light splitters that split the light emitted from the light source into $2^n$ divided lights for use with $2^n$ optical probes.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
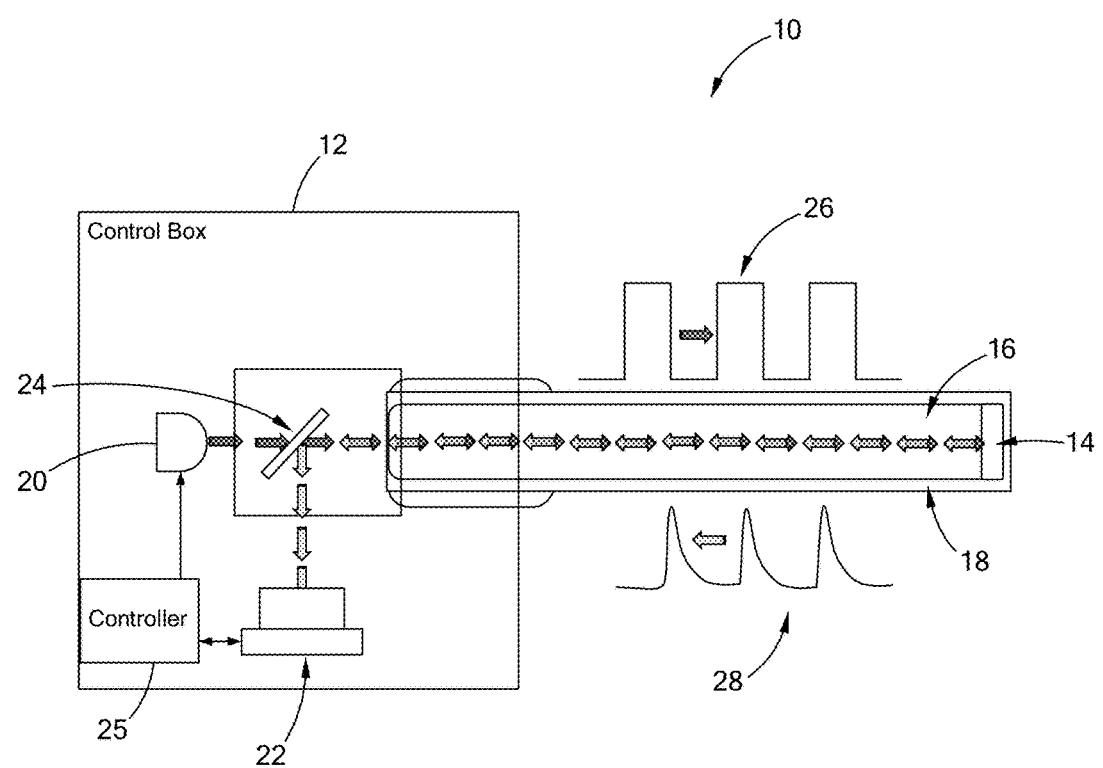
FIG. 1 is a schematic view of a fiber optic sensing system constructed in accordance with one form of the present disclosure.

Referring to FIG. 1, a fiber optic sensing system 10 constructed in accordance with a first form of the present disclosure includes a control box 12, an optical probe 14, and a fiber optic cable 16 connecting the optical probe 14 to the control box 12. The optical probe 14 and the fiber optic cable 16 may be covered by a protective covering 18. The optical probe 14 is configured to be placed proximate a target to detect a temperature of the target and may include a fluorescent material.

The control box 12 includes a light source 20, an optical detector 22, an optical filter 24, and a controller 25 including software and/or firmware for calculating and determining the temperature of the optical probe 14 and consequently the temperature of the adjacent target based on the signal received by the optical detector 22. The light source 20 may be an LED light source, a laser or any conventional light source. The optical filter 24 is placed proximate the light source 20 and in the light path from the light source 20 to the optical probe 14.

In operation, the controller 25 controls the light source 20 to emit a pulsed light toward the optical probe 14. The pulsed light having a first waveform 26 travels through the optical filter 24 toward the optical probe 14 at an end of the fiber optic cable 16 and is absorbed by the fluorescent material of the optical probe 14. The fluorescent material of the optical probe 14 absorbs a part of the light energy and re-emits a light with a second waveform 28 through the same fiber optic cable 16 toward the optical filter 24, which, in turn, reflects the re-emitted light toward the optical detector 22.

The second waveform 28 may be different from the first waveform 16 in terms of wave shape, wavelength, phase and/or intensity. The re-emitted light by the fluorescent material of the optical probe 14 usually has a longer wavelength, and has an intensity different from the intensity of the light originally emitted by the light source due to increased/decreased temperature at the optical probe 14 and the target. The intensity of the re-emitted light by the fluorescent material of the optical probe 14 depends on the absorption and re-emission of the light by the fluorescent material as a function of temperature. The controller 25 of the control box 12 receives signals from the optical detector 22 relating to the intensity of the re-emitted light from the optical probe 14, correlates the intensity of the re-emitted light to the absorption and emission of the fluorescent material of the optical probe 14, and determines the temperature of the fluorescent material and the target based on the absorption and emission of the fluorescent material.

Figure 2:
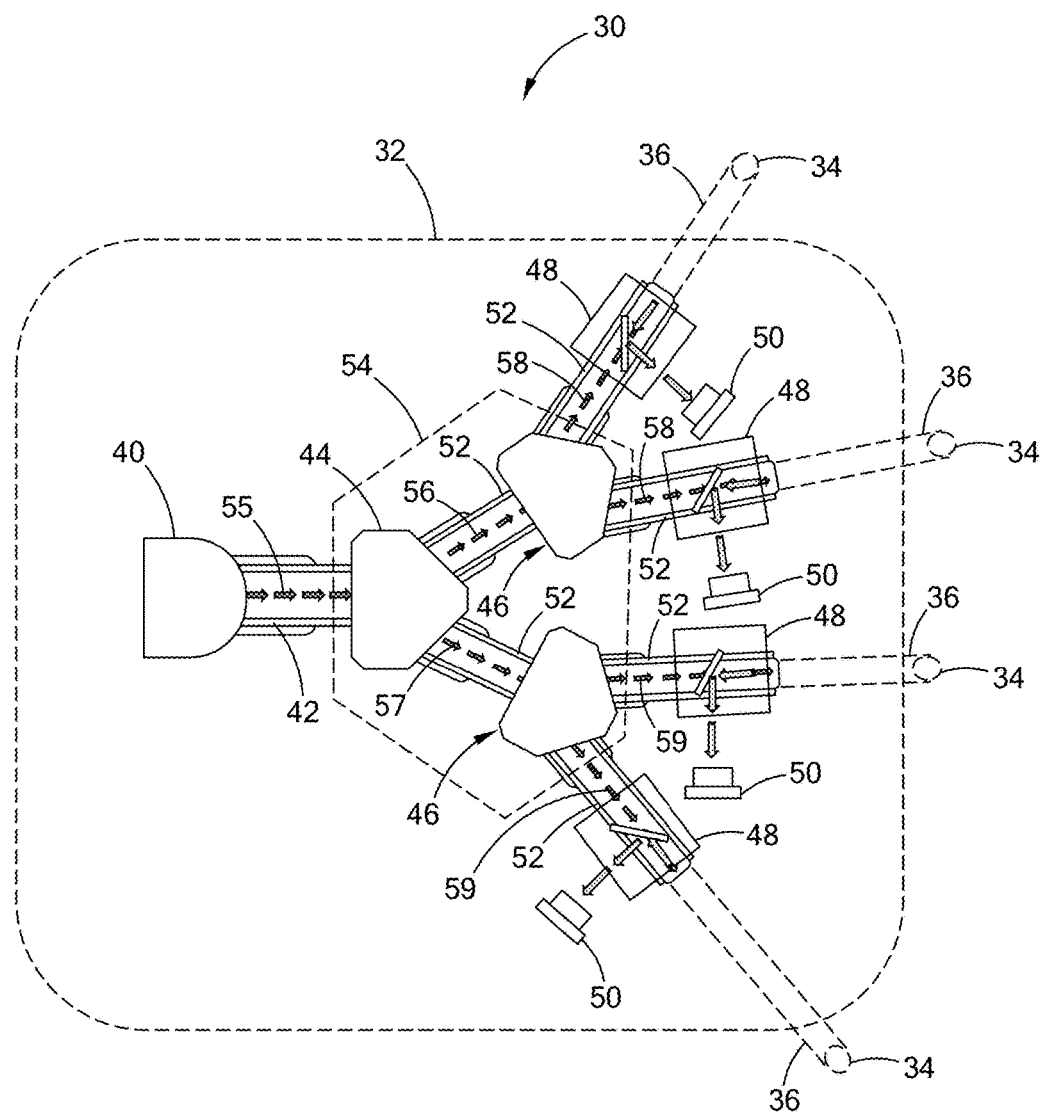
FIG. 2 is a schematic view of a fiber optic sensing system constructed in accordance with another form of the present disclosure.

Referring to FIG. 2, a fiber optic sensing system 30 constructed in accordance with another form of the present disclosure includes a control box 32, a plurality of optical probes 34, and a plurality of fiber optic cables 36 connecting the plurality of optical probes 34 to the control box 32.

The control box 32 includes a light source 40, a main optic cable 42, a primary light splitter 44, a plurality of secondary light splitters 46, a plurality of optical filters 48, a plurality of optical detectors 50, and a plurality of secondary optic cables 52. The primary light splitter 44 is directly connected to the light source 40 by the main optic cable 42. The plurality of secondary light splitters 46 are disposed between the primary light splitter 44 and the plurality of optical filters 48 and are connected to the primary light splitter 44 and the plurality of optical filters 48 by the plurality of secondary optic cables 52. The plurality of optical filters 48 are connected to the plurality of optical probes 34 by the plurality of optic cables 36. The plurality of optical detectors 50 are disposed adjacent to the plurality of light filters 48. The determination of temperatures of the targets by using re-emitted light from the optical probes 34 through the light filters 48 to the optical detectors 50 is similar to that described in connection with FIG. 1. Therefore, the description thereof is omitted herein for clarity.

The primary light splitter 44 and the secondary light splitters 46 constitute a light splitting unit 54, which is configured to split a light from a single light source a number of times into a plurality of divided lights in order to use a single light source 40 to transmit the light to the plurality of optical probes 34 for temperature measurement at a plurality of target locations. As a result, a single control box 32 is needed to simplify the design of the fiber optic sensing system.

In the exemplary form as shown in FIG. 2, the primary light splitter 44 splits the light 55 from the light source 40 into a first divided light 56 and a second divided light 57. The secondary light splitters 48 are connected to the primary light splitter 44 by the secondary optic cables 52 to further split the first divided light 56 into two third divided lights 58 and to further split the second divided light 57 into two fourth divided lights 59. As a result, two third divided lights 58 and two fourth divided lights 59 (i.e., four divided lights in total) are created by one primary light splitter 44 and two secondary light splitters 46.

The number of the light splitters 46 depends on the number of targets to be measured and the number of optical probes 34 being used. The primary light splitter 44 constitutes a first group of light splitter. The two secondary light splitters 46 constitute a second group of light splitters. In the exemplary form of FIG. 2, only one primary light splitter is directly connected to the main optic cable 50 to split the light from the light source into two divided lights. The second group, which includes two light splitters 48, are disposed between the first group of light splitter 46 and the optical filters 36 to further split the light into two divided lights. Therefore, the light from a single light source 40 can be split into four divided lights for use with four optical probes 36.

By continuing this light division, more optical probes 34 may be integrated into the fiber optic sensing system 30. When n groups of splitters are used, the light emitted from the light source is split n times to create $2^n$ divided lights for use with $2^n$ optical probes for detecting temperature of $2^n$ targets, wherein n is zero or any natural number, such as, 0, 1, 2, 3, 4 . . . .

For example, when no light splitter is used (i.e., n=0), the light from the light source is not split and thus only one optical probe can be used with the light source. When a first group of splitter (e.g. only the primary splitter 44) is used (i.e., n=1), the light from the light source is split once to create two divided lights (i.e., $2^1$) for use with two optical probes. When two groups of light splitters (e.g., the primary splitter 44 and two secondary splitters 46) are used (i.e., n=2), the light from the light source is split twice to create four divided lights (i.e., $2^2$=4) for use with four optical probes. When three groups of light splitters (primary splitter 44, two secondary splitters 46 and four tertiary splitters) are used (i.e., n=3), the light from the light source is split three times to create eight divided lights (i.e., $2^3$=8) for use with eight optical probes.

Therefore, by using the light splitting unit 54, a single control box 32, which includes a single light source 40 and a single main optic cable 55, may be used for a plurality of optical probes 34 for measuring temperature of a plurality of targets, thereby simplifying the structure of the fiber optic sensing system for multiple-point temperature measurements. Specific software programs and algorithms may be set up so that each divided light may be calibrated respect to intensity of the light emitted from the light source and the intensity of the received light back from the optical probe. LED or laser may be used as the light source for optimum result.

Figure 3:
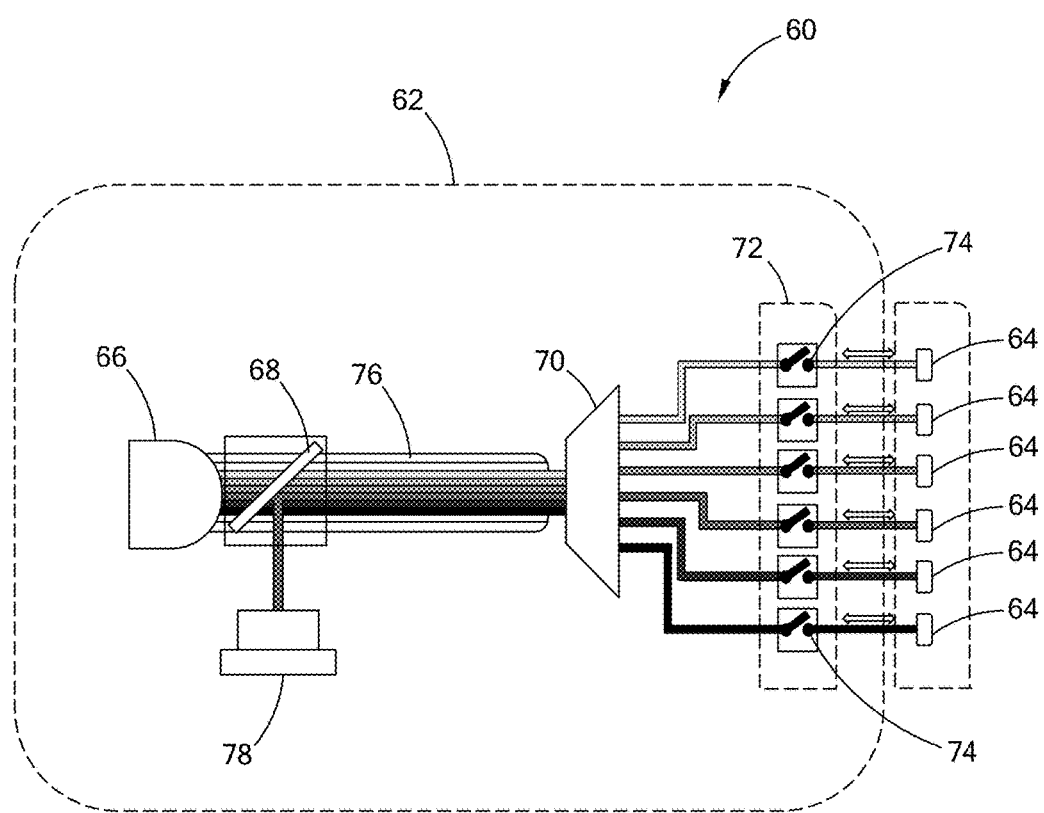
FIG. 3 is a schematic view of a fiber optic sensing system constructed in accordance with yet another form of the present disclosure.

Referring to FIG. 3, a fiber optic sensing system 60 constructed in accordance with another form of the present disclosure uses a wave division multiplexing (WDM) device and optical switches as a light splitting unit for splitting the light. More specifically, the fiber optic sensing system 60 includes a control box 62 and a plurality of optical probes 64. The control box 62 includes a light source 66, an optical filter 68, a wave division multiplexer (WDM) 70, an optical switch module 72, a plurality of optical receivers 74, and an optical detector 78. The light filter 68 is disposed between the light source 66 and the WDM 70. The optical detector 78 is disposed adjacent to the light filter 68.

The wave division multiplexing (WDM) device 70 is configured to divide combined beam of light from a main optic cable 76 into divided lights having multiple wavelengths. The divided lights having different wavelengths are directed to their respective optical receivers 74 and the optical probes 64. The optical switch module 72 is placed between the WDM device 70 and the optical receivers 74 for controlling the divided lights passing through the optical switch module 72 and reaching the optical receivers 74, which function as an open gate or a close gate for each divided light. As shown in FIG. 3, only one or a portion of the divided lights are allowed to pass the optical switch module 72 to reach the respective receivers 74 and the corresponding optical probes 64 for temperature measurements, depending on the number of optical detector 78 being used. When only one optical detector 78 and only one light filter 68 are used, the divided lights are controlled by the optical switch module 72 to reach the respective receivers 74 and the optical probes 64 one at a time.

Whether a fiber optic sensing system can perform simultaneous or sequential temperature measurements at multiple target locations depends on the number of optical filters and optical detectors being used. When only one set of optical filter and optical detector is used, the optical filter is disposed adjacent to the light source and in the main light path for sequential temperature measurements at multiple target locations. When a plurality of optical filters and optical detectors are used, the number of the optical filters and the optical detectors correspond to the number of the divided lights and the number of the optical probes for simultaneous temperature measurements. The optical filters are disposed in the divided light paths.

Figure 4:
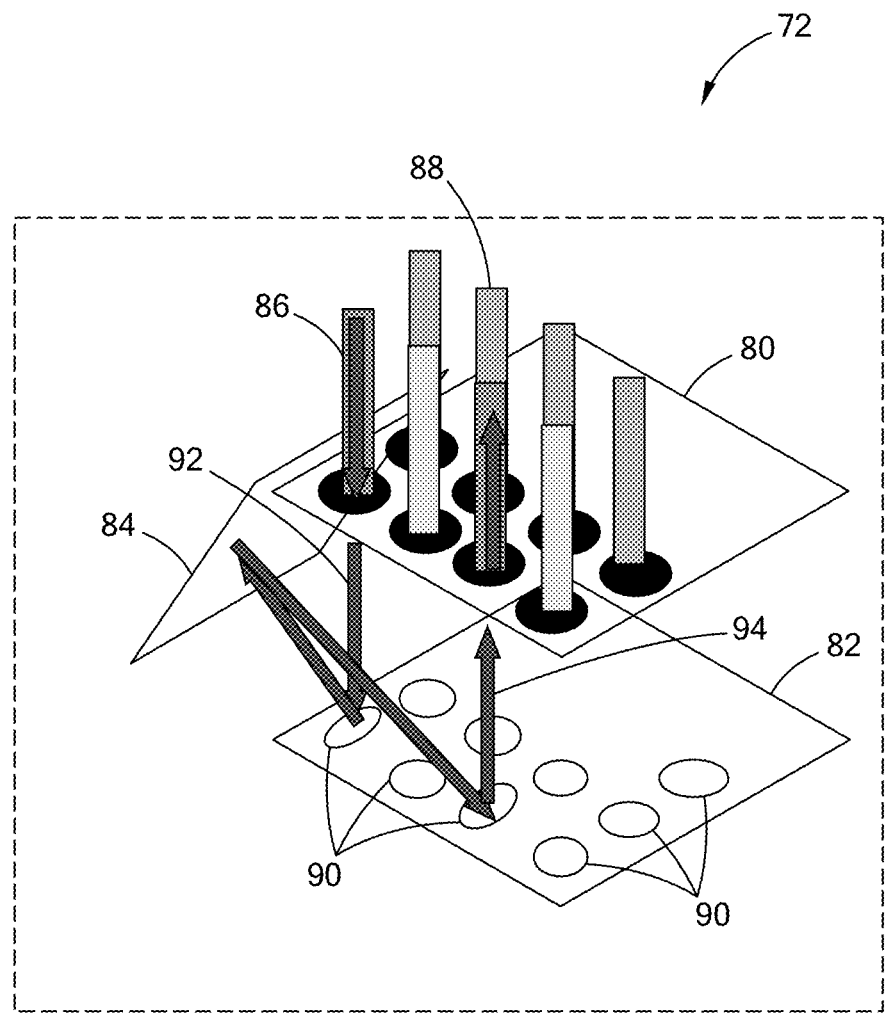
FIG. 4 is a schematic view of a light switching module of the fiber optic sensing system of FIG. 3.

Referring to FIG. 4, the optical switch module 72 may be a microelectromechanical system (MEMS) device, which includes an upper substrate 80, a lower substrate 82, and a reflector 84. The reflector 84 is disposed at an angle relative to the upper and lower substrates 80 and 82. A plurality of input fibers 86 and output fibers 88 are provided on the upper substrate 80. The lower substrate 82 includes a matrix of mirrors 90 integrated in the second substrate 82. The upper and lower substrates 80 and 82 may be silicon chips. When a light is transmitted in an input fiber 86 along an input path 92, the light is reflected by one of the mirrors 90 toward the reflector 84, which in turn reflects the light toward another mirror 90. The other mirror 90 then reflects the light reflected by the reflector 84 along one of the output paths 94 to an output fiber 88. By mechanically moving the lower substrate 82 and changing the position of the mirrors 90, the incident light may not be reflected by the mirrors 90 or the reflected direction of the incident light may be changed, thereby blocking or allowing light transmission to one of the output fibers 88 and then back to a corresponding optical detector.

Figure 5:
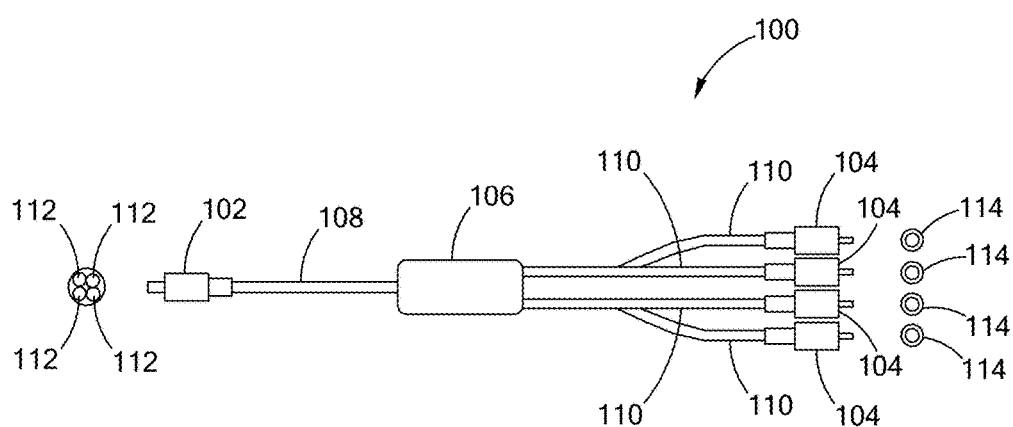
FIG. 5 is a schematic view of a light splitting unit that can be used in the fiber optic sensing system in any of the various forms of the present disclosure.

Referring to FIG. 5, the light splitting unit of the various forms may be replaced with a multi-furcated cable assembly 100. The multi-furcated cable assembly 100 include a first connector 102, a plurality of second connectors 104, a splitting member 106 disposed between the first connector 102 and the second connectors 104, a first optic cable 108, and a plurality of second optic cables 110. The first optic cable 108 includes a plurality of optical fiber cores 112. The plurality of second optic cables 110 are disposed between the splitting member 106 and the second connectors 104 and each have one optical fiber core 114. By connecting the first connector 102 to a light source and by connecting the second connectors 104 to a plurality of optical probes, the multi-furcated cable assembly 100 allow the use of a single light source for multiple optical probes for temperature sensing/measurements at multiple target locations. As previously noted, whether the fiber optic sensing system including the multi-furcated cable assembly 100 can perform simultaneous temperature measurement or sequential temperature measurement at multiple target locations depend on the number of optical filter being used and whether the optical filter(s) is/are disposed in the main light path or the divided light paths.

Figure 6:
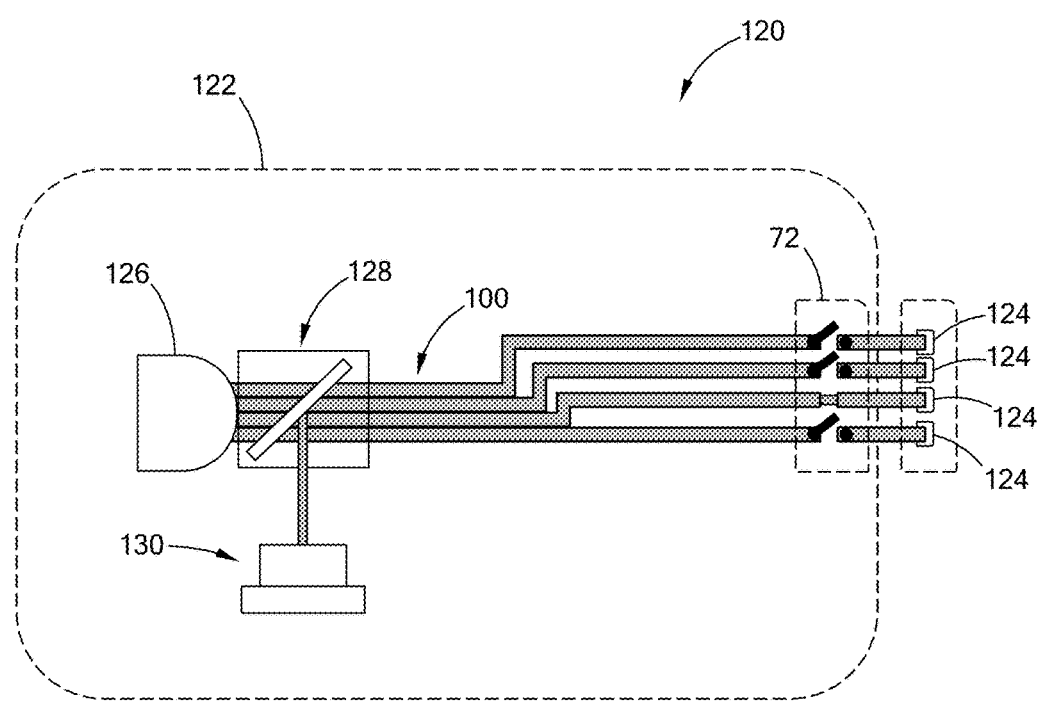
FIG. 6 is a schematic view of a fiber optic sensing system constructed in accordance with still another form of the present disclosure.

Referring to FIG. 6, a fiber optic sensing system 120 constructed in accordance with yet another form of the present disclosure uses a multi-furcated cable assembly 100 of FIG. 5 and an optical switch module 72 in a control box 122. More specifically, the fiber optic sensing system 120 includes control box 122 and a plurality of optical probes 124. The control box 122 includes a light source 126, an optical filter 128, a multi-furcated cable assembly 100, an optical switch module 72, and an optical detector 130. The optical switch module 72 and the multi-furcated cable assembly 100 are similar to those of FIGS. 4 and 5 in terms of structures and function and thus the detailed description thereof is omitted herein for clarify. The optical filter 128 is disposed in the main light path and between the light source 126 and the multi-furcated cable assembly 100. Only one optical detector 130 is provided adjacent to the optical filter 128. By properly controlling the divided lights through the optical switch module 72, only one divided light is transmitted to a corresponding optical probe and re-transmitted by the optical probe back to the optical filter 128 and the optical detector 130. By using the optical switch module 72 and only one optical detector 130, the plurality of optical probes can detect the temperature of a plurality of target locations one at a time.

It should be noted that the disclosure is not limited to the form described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A fiber optic sensing system comprising:
    a plurality of optical probes;
    a light source;
    a light splitting unit connecting the light source to the plurality of optical probes; and
    at least one optical filter disposed in a light path from the light source to the plurality of optical probes for controlling simultaneous or sequential temperature measurement by the plurality of optical probes,
    wherein the light splitting unit splits a light emitted from the light source into a plurality of divided lights, the divided lights being transmitted to the plurality of optical probes.

2. The fiber optic sensing system according to claim 1, wherein the light splitting unit includes at least two groups of light splitters.

3. The fiber optic sensing system according to claim 2, wherein the light splitting unit includes a first group of splitter connected to the light source, and a second group of splitters disposed between the first group of splitter and the optical probes.

4. The fiber optic sensing system according to claim 2, wherein the first group of splitter includes a primary splitter for splitting a light emitted from the light source into a first divided light and a second divided light.

5. The fiber optic sensing system according to claim 4, wherein the second group of splitters include two secondary light splitters for splitting the first and second divided lights into two third divided lights and two fourth divided lights, respectively.

6. The fiber optic sensing system according to claim 1, wherein the light splitting unit includes n groups of light splitters for splitting the light from the light source into $2^n$ divided lights for used with $2^n$ optical probes, wherein n is a natural number.

7. The fiber optic sensing system according to claim 6, wherein the first group of light splitter is directly connected to the light source and includes only one light splitter.

8. The fiber optic sensing system according to claim 1 wherein the optical filter is disposed in a main light path and between the light splitting unit and the light source.

9. The fiber optic sensing system according to claim 8, further comprising an optical detector disposed adjacent to the optical filter.

10. The fiber optic sensing system according to claim 1, wherein the at least one optical filter includes a plurality of optical filters disposed in paths of the divided lights and between the light splitting unit and the plurality of optical probes.

11. The fiber optic sensing system according to claim 10, further comprising a plurality of optical detectors adjacent the plurality of optical filters.

12. The fiber optic sensing system according to claim 1, wherein the optical splitting unit is selected from a group consisting of multiple groups of light splitters, a multifurcated cable assembly, and a wave division multiplexing device.

13. The fiber optic sensing system according to claim 12, further comprising an optical switch module disposed between the light splitting unit and the plurality of optical probes.

14. The fiber optic sensing system according to claim 13, wherein the optical switch module is configured to allow or block one or more of the divided lights to reach the plurality of optical probes.

15. A fiber optic sensing system comprising:
    a plurality of optical probes each including a fluorescent material for detecting a temperature of a target;
    a light source;
    a controller;
    a light splitting unit for splitting a light emitted from the light source into a plurality of divided lights; and
    at least one optical filter disposed in a light path from the light source to the plurality of optical probes for controlling simultaneous or sequential temperature measurement by the plurality of optical probes,
    wherein the divided lights travel to the plurality of optical probes and are absorbed and re-emitted by the fluorescent materials of the plurality of optical probes, the controller determining temperatures of the targets based on re-emitted lights by the plurality of optical probes.

16. The fiber optic sensing system according to claim 15, wherein the controller determines the temperature of the plurality of targets simultaneously.

17. The fiber optic sensing system according to claim 16, further comprising a plurality of optical filters disposed in the paths of the divided lights.

18. The fiber optic sensing system according to claim 16, wherein the controller determines the temperature of the plurality of targets sequentially.

19. The fiber optic sensing system according to claim 15, further comprising an optical switch module for controlling transmission and blocking of the divided lights to the optical probes.

20. A fiber optic sensing system comprising:
    a single light source;
    a plurality of optical probes;
    at least one optical filter disposed in a light path from the light source to the plurality of optical probes for controlling simultaneous or sequential temperature measurement by the plurality of optical probes; and
    a plurality of light splitters disposed between the single light source and the plurality of optical probes, the plurality of light splitters including n groups of light splitters that split the light emitted from the light source into $2^n$ divided lights for use with $2^n$ optical probes.

* * * * *